US005695179A

United States Patent [19]

Hobson

[11] Patent Number: 5,695,179

[45] Date of Patent: Dec. 9, 1997

[54] CONTAINER HOLDING APPARATUS FOR USE WITH CLOSURE TORQUE TESTER

[75] Inventor: Vernon Larry Hobson, Marshall, Ind.

[73] Assignee: Alcoa Closure Systems International, Inc., Crawfordsville, Ind.

[21] Appl. No.: 553,023

[22] Filed: Nov. 3, 1995

[51] Int. Cl.[6] .......... B23Q 1/04

[52] U.S. Cl. .......... 269/222; 269/242

[58] Field of Search .......... 269/241, 242, 269/219, 221, 222, 139, 274

[56] References Cited

U.S. PATENT DOCUMENTS

| | | | |
|---|---|---|---|
| 1,382,793 | 6/1921 | Lewis | 269/221 |
| 2,103,074 | 12/1937 | Gardner | 269/221 |
| 3,290,039 | 12/1966 | Lancaster | 269/242 |
| 4,736,934 | 4/1988 | Grech | 269/242 |
| 5,301,934 | 4/1994 | Lynn et al. | 269/222 |

*Primary Examiner*—Robert C. Watson
*Attorney, Agent, or Firm*—Dressler, Rockey, Milnamow & Katz, Ltd.

[57] ABSTRACT

A container holding apparatus is configured for use with an associated piece of testing equipment, such as a torque tester for applying torque to a closure on the container. The holding apparatus includes a pair of selectively positionable gripping members which are mounted on and extend between a pair of drive screws of the apparatus. One of the gripping members is operatively connected with a clamp mechanism, which in turn is mounted on the drive screws. By this arrangement, conjoint rotation of the drive screws moves the gripping members toward and away from each other, with the clamp mechanism facilitating convenient gripping and release of a container after the apparatus is adjusted, by rotation of the drive screws, for the particular size of container to be tested. In the preferred form, the apparatus includes a support plate upon which the container rests as it is releasably gripped and held by the gripping members.

10 Claims, 2 Drawing Sheets

CONTAINER HOLDING APPARATUS FOR USE WITH CLOSURE TORQUE TESTER

TECHNICAL FIELD

The present invention relates generally to an apparatus for holding a container during use of an associated piece of testing equipment, and more particularly to a container holding apparatus including separately operable adjusting and clamping mechanisms for efficient and versatile use, with the arrangement configured for firmly supporting an associated container during testing, such as testing of closures fitted to the container.

BACKGROUND OF THE INVENTION

Plastic closures such as disclosed in U.S. Pat. Nos. 4,497,765, and 4,938,370, hereby incorporated by reference, have proven to be very commercially successful in view of their suitability for a wide range of applications, including containers for carbonated beverages. Such plastic closures can be readily configured for tamper-indication, thus assuring consumers of the integrity of the contents of an associated container.

Development of such plastic closures entails extensive testing of various performance characteristics of the closures. Aside from sealing performance under various conditions, it is ordinarily necessary to perform testing of rotational torques applied to a closure during threading and unthreading of the closure. Such torque testing assures that closures can be properly applied with the high-speed capping equipment typically employed in a bottling operation, and further assures that consumers can conveniently remove a closure from its associated container.

Torque testing is ordinarily performed with an apparatus which includes instrumentation to measure closure application and removal torques. Use of such an apparatus requires that an associated bottle or other container be firmly gripped and held in a centered position with respect to the torque-measuring head of the testing device. To this end, devices are known which can releasably hold a container in position for testing. One heretofore known arrangement includes a rotatable shaft having oppositely threaded portions on which are respectively mounted a pair generally parallel clamping elements. By rotation of the threaded shaft, the clamping elements are moved toward and away from each other. Each of the clamping elements includes a series of openings for adjustably positioning a pair of peg-like members on each of the clamping elements. After the peg-like members are positioned on the clamping elements to accommodate the size of container to be tested, the threaded shaft is rotated so that the clamping members are moved together, thereby bringing the two pairs of peg-like members into engagement with the container.

Although this type of previously known container holding arrangement can be adjusted to hold a container and closure in position for torque testing, its configuration does not lend itself to convenient and efficient use. Because the threaded shaft of the device is generally centrally located, and extends beneath an associated container mounted in the device, it is necessary that a container be positioned in spaced relationship above the threaded shaft, with the container supported solely by the peg-like members. Careful and precise positioning of the container is necessary to assure that it is properly positioned with respect to the instrumented head of the torque tester. Additionally, the threaded shaft of the arrangement functions to provide both adjustment and container clamping, thus requiring manipulation of the shaft each time that the container to be tested is replaced. Since it is frequently necessary to test a relatively large number of containers and closures to obtain statistically meaningful test data, the care which must be exercised during use of this clamping arrangement detracts from efficient and convenient testing.

The present invention is directed to an improved container holding apparatus which facilitates testing of closures and containers by providing separate adjustment and clamping mechanisms.

SUMMARY OF THE INVENTION

The container holding apparatus of the present invention is configured for releasably holding an associated container during testing, such as during torque testing of a closure applied to the container. The apparatus is preferably mounted on an associated piece of testing equipment, and is configured to permit its convenient adjustment for use with containers of various sizes. Once the apparatus has been adjusted for use with containers of a given size, a lever-operated clamp mechanism of the apparatus permits each container and closure to be tested to be efficiently positioned and held for testing. In the preferred form, a support member is provided upon which the container is positioned, thus desirably avoiding the need for the weight of the container to be solely supported by movable clamping components or the like.

In accordance with the illustrated embodiment, the present apparatus includes a frame which is preferably mounted on the associated piece of test equipment, and a pair of generally parallel, spaced apart drive screws rotatably mounted on the frame. A drive mechanism, including a drive member interconnecting the drive screws, is provided so that the drive screws are connected for rotation in unison. A knob-like operating handle operatively connected to the drive screws effects their conjoint rotation.

In order to effect secure gripping and holding of an associated container, the present apparatus includes first and second container gripping members each mounted on and extending generally between the pair of rotatable drive screws. The first gripping member includes screw threads which are in mesh with the drive screws, so that rotation of the drive screws laterally moves the first gripping member toward and away from an associated container positioned between the gripping members. In contrast, the second gripping member is slidably disposed on the drive screws.

The present apparatus includes a clamping arrangement connected to the second gripping member. The clamping arrangement includes a mounting member which extends between the drive screws, with the mounting member including screw threads in mesh with the drive screws so that rotation of the drive screws laterally moves the clamping arrangement and second gripping member toward and away from an associated container positioned between the gripping members. By this arrangement, the present apparatus can be initially adjusted, by rotation of the drive screws, for use with containers of a given size.

The clamping arrangement further includes a selectively operable clamp mechanism connected to the second gripping member for displacing the second gripping member laterally of the threaded mounting member. By this construction, the clamp mechanism can be easily operated to grip and release a container, between the gripping members, by displacement of the second gripping member toward the first gripping member. Thus, after initial adjustment by rotation of the drive screws, subsequent gripping and release of containers is easily and efficiently effected by use of the clamp mechanism, which preferably comprises a lever-operated plunger clamp.

In the preferred embodiment, each of the gripping members includes a pair of generally upright gripping projections, with each of the gripping members preferably including a series of adjustment holes for adjustably positioning the gripping projections along the extend of each gripping member.

In the preferred embodiment, the present apparatus includes a support member positioned generally intermediate the first and second gripping members for supporting a container thereon. This arrangement desirably acts to firmly support the container as it is held by the gripping projections, but precludes the need for the gripping projections to support as well as grip the container. In the illustrated embodiment, the support member is provided in the form of a support plate which extends generally between the first and second gripping members, and which is connected to one of the gripping members for movement therewith. The support plate preferably defines at least one opening through which extend the gripping projections of the other one of the gripping members.

Other features and advantages of the present invention will become readily apparent from the following detailed description, the accompanying drawings, and the appended claims.

DETAILED DESCRIPTION

Figure 1:
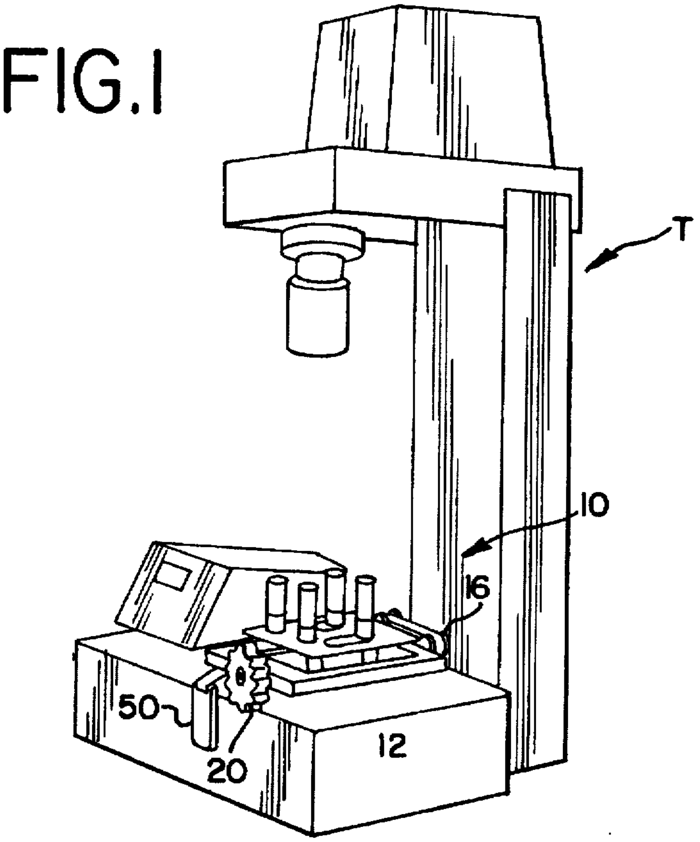
FIG. 1 is a perspective view of a closure testing apparatus, and a container holding apparatus configured in accordance with the present invention.
Figure 2:
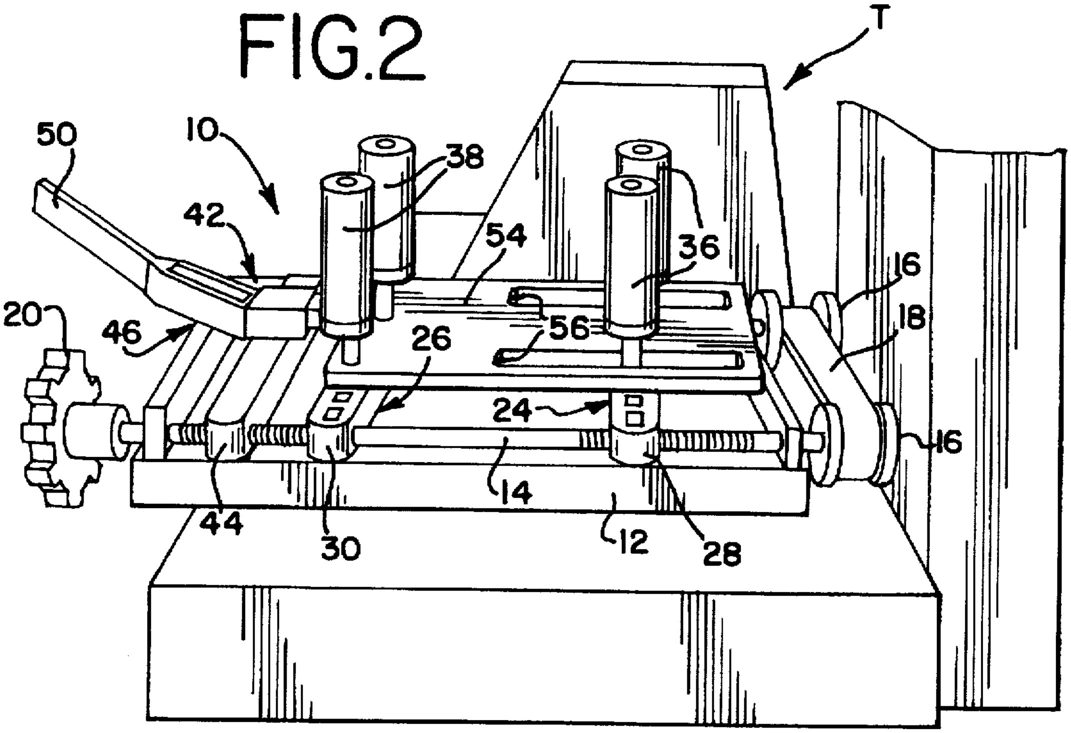
FIG. 2 is a perspective view of the present container holding apparatus.
Figure 3:
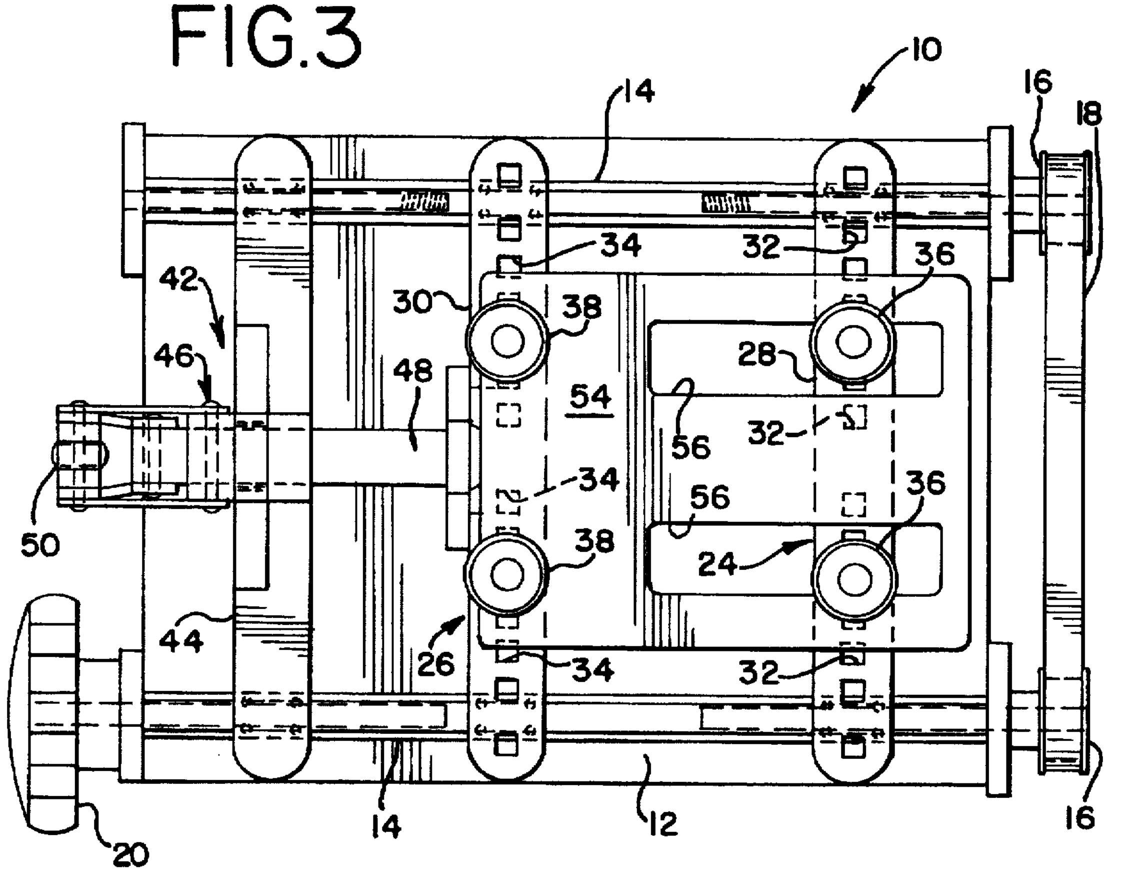
FIG. 3 is a top plan view of the present apparatus.
Figure 4:
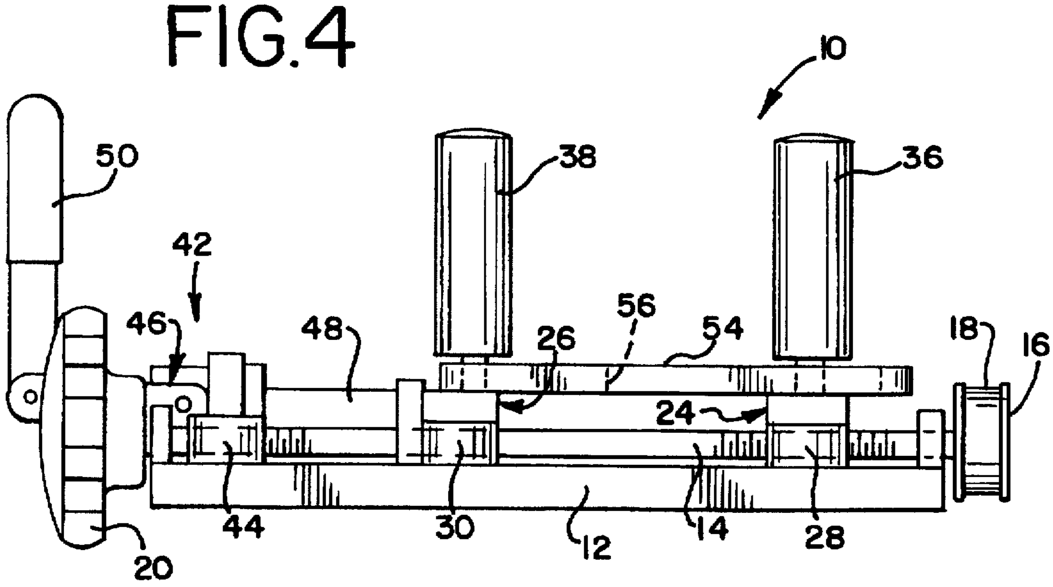
FIG. 4 is a side elevational view of the present apparatus.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

FIG. 1 illustrates a testing apparatus T with which the container holding apparatus 10 of the present invention is particularly suited for use. The illustrated testing apparatus T is a so-called torque tester, which includes suitable instrumentation for measuring torques applied to a closure as the closure is either threaded onto, or threaded off of, an associated container. The present apparatus 10 is configured to facilitate releasable holding of a container during such testing, assuring that the container is properly positioned and centered with respect to the instrumented torque-applying head of the testing apparatus T.

Container holding apparatus 10 is desirably straightforward in construction and configuration for economical manufacture, and convenient and efficient use. The apparatus includes a generally rectangular frame 12 on which are mounted a pair of generally parallel, spaced apart drive screws 14. Each drive screw includes oppositely threaded end portions (i.e., right-hand threaded and left-hand threaded portion). The drive screws are arranged such that each threaded portion is positioned in alignment with a similarly threaded portion of the other screw (i.e., the right-hand thread of one drive screw is aligned with the right-hand thread of the other drive screw; the left-hand threaded portions are similarly aligned).

The drive screws are interconnected for rotation in unison by a drive mechanism which includes a pair of pulleys 16 respectively mounted on the ends of the drive screws 14, and a drive belt 18 extending between and about the drive pulleys. In the illustrated arrangement, the arrangement of the drive belt 18 is such that the drive screws rotate together in this same rotational direction. A knob-like operating handle 20 is operatively connected with the drive screws, such as by connection to one of the screws as in the illustrated embodiment, whereby manual rotation of the operating handle effects conjoint rotation of the drive screws 14.

Gripping of an associated container is effected by the provision of first and second gripping members 24 and 26. The gripping members 24 and 26 extend generally between the drive screws 14, and, as will be further described, are movable toward and away from each other attendant to rotation of the drive screws.

The gripping members 24 and 26 respectively include mounting elements 28 and 30, which mounting elements extend between and are mounted on drive shafts 14. Mounting element 28 includes screw threads in mesh with the similarly threaded portions of the drive screws 14 while mounting element 30, in contrast, is slidably mounted on the drive screws 14.

The mounting elements 28 and 30 define a series of openings 32, 34 which extend generally along the lengths of the mounting elements. The gripping members further include a first pair of gripping projections 36 mounted on mounting element 28, and a second pair of gripping projections 38 mounted on mounting element 30. Each of the gripping projections is removably positionable in a respective one of the openings 32, 34 thus permitting the present apparatus to be conveniently configured for differently sized containers. The openings 32, 34 are preferably square-shaped, with the ends of the projections 36, 38 also being square-shaped for fitment into the openings. This prevents rotation of the projections during use of the apparatus, and desirably avoids the need to grip a container as tightly as was required in previous clamping devices.

As noted, second gripping member 26 is slidably mounted on drive screws 14. In order to effect displacement of the gripping member along the drive screws, the apparatus 10 includes a clamping arrangement, generally designated 42, which effectively interconnects the second gripping member with the threaded portions of the drive screws 14. The clamping arrangement includes a mounting member 44 which extends between and is mounted on the drive screws 14. Mounting member 44 includes screw threads in mesh with the similarly threaded portions of drive screws 14. By this arrangement, conjoint rotation of drive screws 14 moves the mounting member 44 axially along the drive screws.

The clamping arrangement 42 further includes a clamp mechanism 46 which is mounted on the mounting member 44, and which is connected to second gripping member 26. The clamp mechanism is selectively operable for displacing the second gripping member laterally of the mounting member. To this end, the clamp mechanism includes a reciprocable plunger 48 connected to second gripping member 26, with the plunger reciprocably moved by movement of a pivotally mounted operating lever 50. This type of clamp mechanism, sometimes referred to as a plunger clamp, includes a cam-like arrangement so that pivotal movement of lever 50 reciprocates plunger 48, thereby displacing second gripping member 26 with respect to mounting member 44. A current embodiment of the present invention employs a clamp member available from Carr Lane Manufacturing Co. of St. Louis, Mo. (Model No. CL-250-TPC). Of course, other suitable clamp mechanisms can be employed.

A particularly preferred feature of the present apparatus is the provision of a container support member generally intermediate the first and second gripping members 24, 26. In the illustrated embodiment, this support member is provided in the form of a support plate 54 which extends generally between the gripping members 24, 26. In the illustrated embodiment, the support plate 54 is connected to one of the gripping members, i.e., second gripping member 26 in the illustrated embodiment. The support plate 54 is thus configured for movement with the second gripping member attendant to rotation of operating handle 20, and operating lever 50. In the preferred form, the support plate 54 defines at least one opening through which extend the gripping projections 36 of first gripping member 24. In the illustrated embodiment, support plate 54 includes openings in the form of generally elongated slots 56 through which gripping projections 36 respectively extend. It is within the purview of the present invention to employ the central portion of frame 12 as the container support member, in lieu of the illustrated support plate 54.

From the foregoing, use of the present container holding apparatus will be readily appreciated. First, gripping projections 36 and 38 are appropriately positioned along the respective mounting elements 28, 30 for the size of containers to be tested. Next, operating handle 20 is rotated for effecting rotation of drive screws 14, thereby moving first gripping member 24, and second gripping member 26 (by virtue of its attachment to mounting member 44) to further adjust the apparatus for the size of containers to be tested. Finally, clamp mechanism 46 is operated by movement of lever 50 to "open" the gripping members by displacement of second gripping member 26 away from first gripping member 24. A container and closure to be tested are next positioned on support plate 54, and clamp mechanism 46 again operated so that second gripping member 26 is displaced toward the container. Gripping projections 36, 38 engage the container, with the container thus firmly held in position by the gripping projections as the container is carried by support plate 54. The gripping projections 36, 28 are preferably provided with elastomeric material for engagement with the container thus assuring its stability during testing. When testing of the closure and container is complete, the clamp mechanism is operated to release the container, with another container and closure to be tested easily placed in position on the apparatus, and gripped by operation of the clamp mechanism.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. An apparatus for releasably holding a container during testing, comprising:

a frame;

a pair of generally parallel drive screws rotatably mounted on said frame;

a drive mechanism including a drive member interconnecting said drive screws so that said drive screws are connected for rotation in unison, and an operating handle operatively connected to said drive screws for effecting rotation thereof;

first and second container gripping members each mounted on and extending generally between said drive screws;

said first gripping member including screw threads in mesh with said drive screws so that rotation of said drive screws laterally moves said first gripping member toward and away from an associated container positioned between said gripping members, said second gripping member being slidably disposed on said drive screws; and a clamping arrangement connected to said second gripping member, said clamping arrangement including a mounting member extending between said drive screws and including screw threads in mesh with said drive screws, so that rotation of said drive screws laterally moves said clamping arrangement and said second gripping member toward and away from an associated container positioned between said gripping members, said clamping arrangement including a selectively operable clamp mechanism connected to said second gripping member for displacing said second gripping member laterally of said mounting member, so that after adjustment by rotation of said drive screws, said clamp mechanism is operable to displace said second gripping member toward said first gripping member for gripping and holding an associated container therebetween.

2. A container holding apparatus in accordance with claim 1, wherein said drive member interconnecting said drive screws comprises a drive belt.

3. A container holding apparatus in accordance with claim 2, wherein each of said first and second drive screws include oppositely threaded portions, said drive belt interconnecting said drive screws for rotation together in the same rotational direction.

4. A container holding apparatus in accordance with claim 1, wherein each of said first and second gripping members includes a pair of generally upright gripping projections, each said gripping member including means for adjustably positioning said gripping projections to facilitate holding of differently sized containers.

5. A container holding apparatus in accordance with claim 1, including a container support plate extending generally between said first and second gripping members for supporting a container held by said gripping members.

6. A container holding apparatus in accordance with claim 5, wherein each of said first and second gripping members includes a pair of generally upright gripping projections, said support plate being fixed to one of said gripping members for movement therewith, and defining at least one opening through which extend said gripping projections of the other one of said gripping members.

7. An apparatus for releasably holding a container during testing, comprising:

a frame;

a pair of generally parallel spaced apart drive screws rotatably mounted on said frame;

a drive mechanism including a drive belt interconnecting said drive screws so that said drive screws are connected for rotation in unison with each other, and an operating handle connected to one of said drive screws for effecting rotation of said drive screws;

first and second container gripping members each including a pair of generally upright gripping projections engageable with an associated container, said gripping member being mounted on and extending between said drive screws, a container support member positioned generally intermediate of said gripping members for supporting a container thereon;

said first gripping member including screw threads in mesh with said drive screws so that rotation of said drive screws laterally moves said first gripping member toward and away from an associated container positioned between said pair of gripping projections, said second gripping member being slidably disposed on said drive screws; and a clamping arrangement connected to said second gripping member, said clamping arrangement including a mounting member extending between said drive screws and including screw threads in mesh with said drive screws, so that rotation of said drive screws laterally moves said clamping arrangement and said second gripping member toward and away from an associated container positioned between said pairs of gripping projections, said clamping arrangement including a selectively operable clamp mechanism for displacing said second gripping member laterally of said mounting member, so that after adjustment by rotation of said drive screws, said clamp mechanism is operable to displace said second gripping member toward said first gripping member so that said gripping projections grip and hold an associated container positioned on said support member.

8. A container holding apparatus in accordance with claim 7, wherein said support member comprises a support plate connected to one of said gripping members for movement therewith, said support plate defining at least one opening through which extend the gripping projections of the other one of said gripping members.

9. A container holding apparatus in accordance with claim 7, wherein each of said gripping projections includes elastomeric material engageable with the associated container.

10. A container holding apparatus in accordance with claim 7, wherein said clamp mechanism includes a reciprocable plunger and a pivotally mounted lever movable to reciprocate said plunger.

* * * * *